(12) United States Patent
Yakimchuk

(10) Patent No.: US 7,320,490 B2
(45) Date of Patent: Jan. 22, 2008

(54) IMPACT HANDLE FOR SHOVELS AND RELATED HAND TOOLS

(76) Inventor: Ray James Yakimchuk, P.O. Box 840, Spicer, MN (US) 56288

( * ) Notice: Subject to any disclaimer, the term of this patent is extended or adjusted under 35 U.S.C. 154(b) by 138 days.

(21) Appl. No.: 11/224,440

(22) Filed: Sep. 12, 2005

(65) Prior Publication Data

US 2007/0057521 A1    Mar. 15, 2007

(51) Int. Cl.
*A01B 1/02*    (2006.01)
*B25D 1/16*    (2006.01)

(52) U.S. Cl. .......................... 294/49; 294/8.6; 294/57; 294/59; 173/128

(58) Field of Classification Search ............ 294/49–60, 294/8.6; 81/464; 173/205, 128, 132
See application file for complete search history.

(56) References Cited

U.S. PATENT DOCUMENTS

| | | | |
|---|---|---|---|
| 2,904,661 A | 9/1959 | Roeser | |
| 3,129,775 A | 4/1964 | Connelly | |
| 3,623,173 A | 11/1971 | Hacqvist | |
| 4,361,311 A * | 11/1982 | Koroyasu et al. | 254/200 |
| 4,743,834 A | 5/1988 | Rice | |
| 4,872,231 A | 10/1989 | Gustavsen | |
| 5,255,894 A * | 10/1993 | Guarneri | 254/200 |
| 5,370,192 A * | 12/1994 | Evinger | 173/90 |
| 5,865,490 A * | 2/1999 | Vowell | 294/57 |
| 6,101,725 A | 8/2000 | Linden | |
| 6,128,979 A * | 10/2000 | Shepherd | 81/45 |
| 6,826,024 B2 | 11/2004 | Takeda | |
| 6,845,300 B2 | 1/2005 | Haghgooie et al. | |
| 6,928,682 B1 | 8/2005 | Hahn | |

FOREIGN PATENT DOCUMENTS

JP    57-183526 A    11/1982

* cited by examiner

*Primary Examiner*—Dean J Kramer

(57) ABSTRACT

An impact handle for a shovel and other tools to assist the user or laborer in digging and/or moving material such as dirt or snow, or other compacted materials. An impact handle with a shovel attachment would have similar physical features as generic shovels on the market today. However, the impact handle includes an impact generator within the handle. As a user or operator applies his/her foot-pressure on the foot actuator located at the top of the scoop or blade, the impact generator using electro-magnetic principles produces impulses of 1 to 10 hertz of downward blows. These impulses reduce the effort required by the operator to force the tool scoop or blade to penetrate the material being excavated. The impact handle dramatically reduces time required to complete hand excavation projects. The impact handle can also be used, but is not limited to, to reduce the time required for chiseling, scraping, prying, nail pulling and carpet-stretching.

9 Claims, 8 Drawing Sheets

Fig. 7
Fig. 8
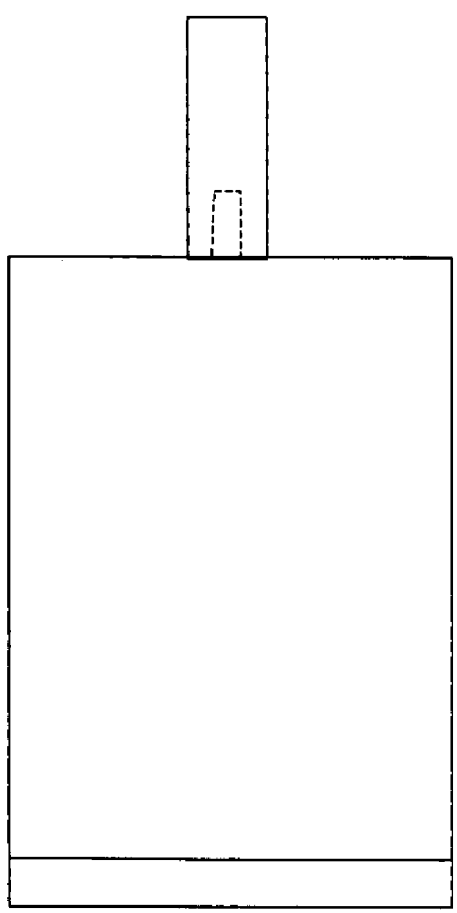

Fig. 9
Fig. 10
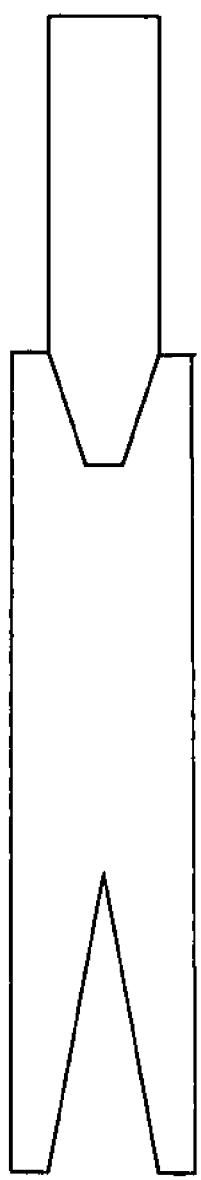
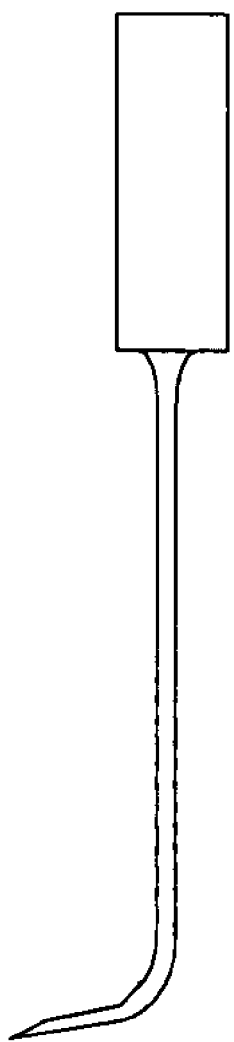

IMPACT HANDLE FOR SHOVELS AND RELATED HAND TOOLS

CROSS REFERENCE TO RELATED APPLICATIONS (Not Applicable)

STATEMENT OF FEDERALLY SPONSORED RESEARCH/DEVELOPMENT (Not Applicable)

REFERENCE TO A "SEQUENCE LISTING," A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC (Not Applicable)

BACKGROUND OF THE INVENTION

The present invention relates to a new impact handle for use with a shovel or other similar hand tool for digging into and moving soil, ice, packed snow and similar materials particularly those that are difficult to penetrate with conventional hand tools.

Because of the high expense and technical ability required to own and operate heavy equipment, contractors, landscapers, irrigation installers, homeowners and numerous other users generally rely on hand excavation for small excavation projects. In addition, often site conditions do not allow access by mechanized equipment. Hand excavation typically relies on conventional hand tools such as shovels and picks. However, in compacted soils such as hardpans and clays, hand excavation may be problematic. With the present invention, the traditional 'pick & shovel' tool handle can be replaced by an electro-magnetic impact handle for hand excavation. The impact shovel handle is preferably used on hand tool implements that benefit from an impact force being available to assist the penetration of the material being handled. Typical tool examples would include shovels, chisels, scrapers, crow bars and carpet stretchers.

In these respects, the handle according to the present invention substantially departs from the conventional concepts and designs of the prior art, and in so doing provides an apparatus primarily developed for the purpose of providing a substantially improved tool handle.

BRIEF SUMMARY OF THE INVENTION

This invention uses a magnetic flux coil to reciprocate an impact slug within a chamber in the impact handle. Therefore in exterior appearance the impact handle on a shovel would be similar to a conventional shovel handle. The impact slug with a weight of about 1 lb. is the form of a permanent magnet that reciprocates at a variable rate preferably between 1 and 10 hertz between a rubber stopper and a static impact surface. When the impact slug hits the static impact surface, additional downward force is transmitted to the shovel blade to assist penetration of the soil.

It is therefore an object of the present invention to provide a new impact handle for use which has many of the advantages of handles mentioned heretofore and several novel features that result in a new impact handle for use on a tool which is not anticipated, rendered obvious, suggested, or even implied by any of the prior art tool handles, either alone or in any combination thereof.

Still yet another object of the present invention is to provide a new impact handle which provides in the apparatuses of the prior art some of the advantages thereof, while simultaneously overcoming some of the disadvantages normally associated therewith.

It is another object of the present invention to provide a new impact handle which can reduce the effort required to break into compacted soils, thereby reducing the deleterious effects of digging that accumulate over time on the bodies of gardeners, landscapers and construction laborers.

It is another object of the present invention to provide a new impact handle that can be activated by a foot actuator or a hand operated impulse switch.

It is another object of the present invention to provide a new impact handle which can be used with a shovel, chisel, crow bar, floor scraper and carpet stretcher.

It is another object of the present invention to provide a new impact handle in which the thumb of the individual user may be effectively utilized to alleviate some of the monotony and drudgery from hand excavation.

It is another object of the invention to provide a new impact handle that provides the common laborer with added dignity for a hand excavation assignment by using a technologically sophisticated device/tool.

It is another object of the invention to provide a new impact handle that can be manufactured from a variety of materials with sufficient strength for the application when containing the impact generator within. Typical materials may include fiberglass and epoxy resins or composite materials, molded plastics such as polypropylene plastic or cast and extruded metals such as aluminum.

It is another object of the present invention to provide a new impact handle which may be easily and efficiently manufactured and marketed.

It is a further object of the present invention to provide a new impact handle which is of a durable and reliable construction.

An even further object of the present invention is to provide a new impact handle which has a low cost of manufacture with regard to both materials and labor, and which accordingly is then susceptible of low prices of sale to the consuming public, thereby making such impact handle economically available to the buying public.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE SEVERAL VIEWS OF THE DRAWING

The invention will be better understood and objects other than those set forth above will become apparent when consideration is given to the following detailed description thereof. Such description makes reference to the annexed drawings wherein:

FIG. 7 is a front elevational view of the scraper tool head attachment.

FIG. 8 is a side view of the scraper tool head attachment.

FIG. 9 is a front elevational view of the crow bar tool head attachment.

FIG. 10 is a side view of the crow bar tool head attachment.

DETAILED DESCRIPTION OF THE INVENTION

Figure 1:
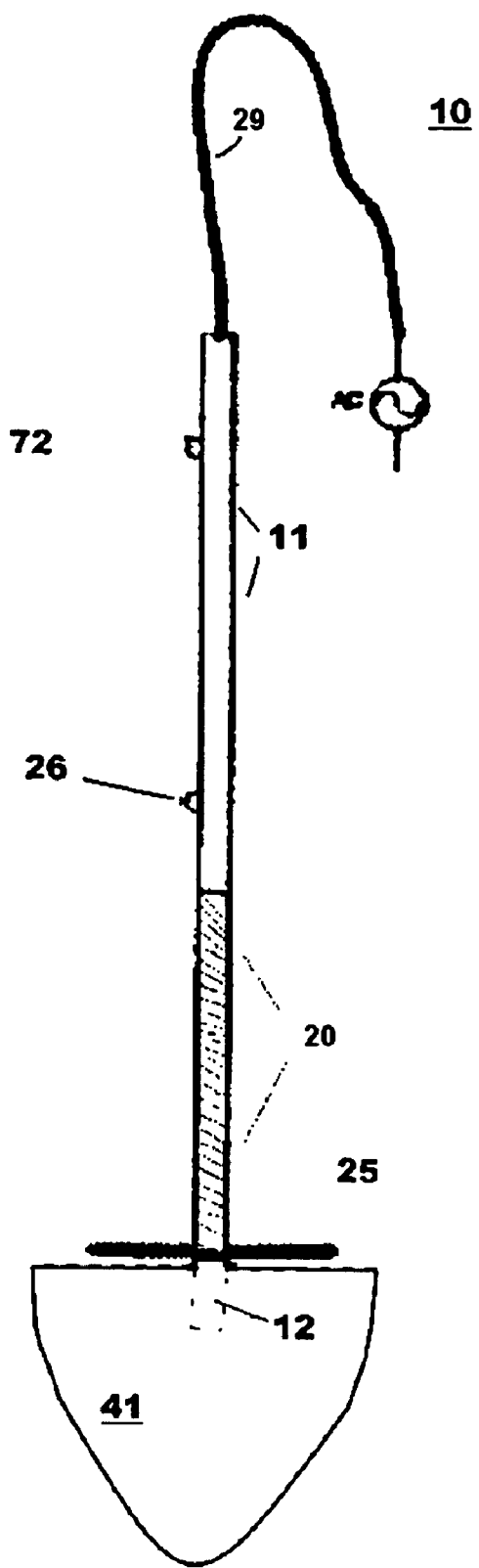
FIG. 1 is a front elevation view of the impact handle according to the present invention.

With reference now to the drawings, a new impact handle embodying the principles and concepts of the present invention and generally designated by the reference numeral 10 will be described.

In physical appearance, as shown in FIG. 1 an impact handle 10 with a shovel blade attached would look very much like an ordinary shovel. The impact handle 10 would have a tool end 12 that would have a tool head 40 such as a shovel blade 41 fixedly attached to it. A free end 11 would be opposite the tool end 12 of the impact handle 10. A portion of the impact handle would be used to contain an impact generator 20.

Figure 5:
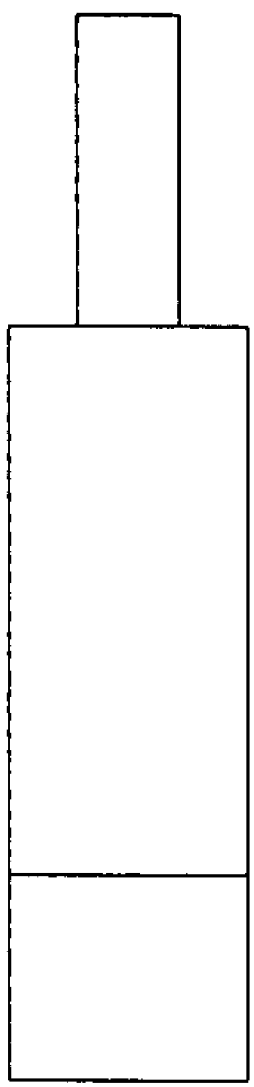
FIG. 5 is a front elevational view of the chisel tool head attachment.
Figure 6:
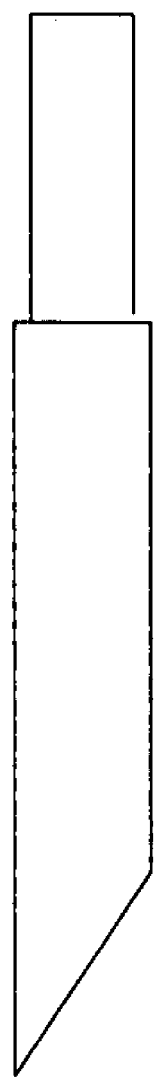
FIG. 6 is a side view of the chisel tool head attachment.
Figure 11:
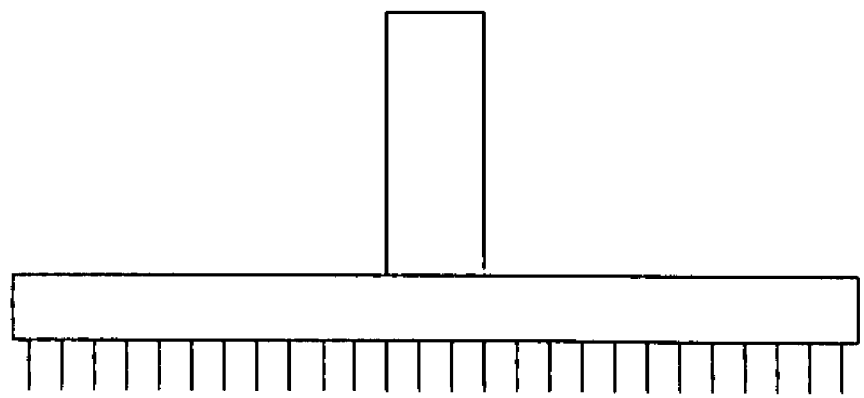
FIG. 11 is a front elevational view of the carpet stretcher tool head attachment.
Figure 12:
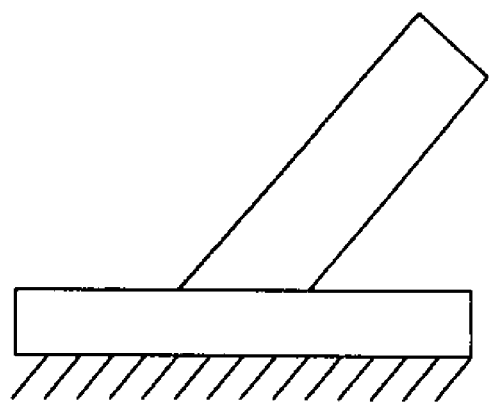
FIG. 12 is a side view of the carpet stretcher tool head attachment.

The tool head may also be a chisel (see FIGS. 5 and 6), a scraper (see FIGS. 7 and 8), a crow bar (see FIGS. 9 and 10) or a carpet stretcher (see FIGS. 9 and 10).

Figure 2:
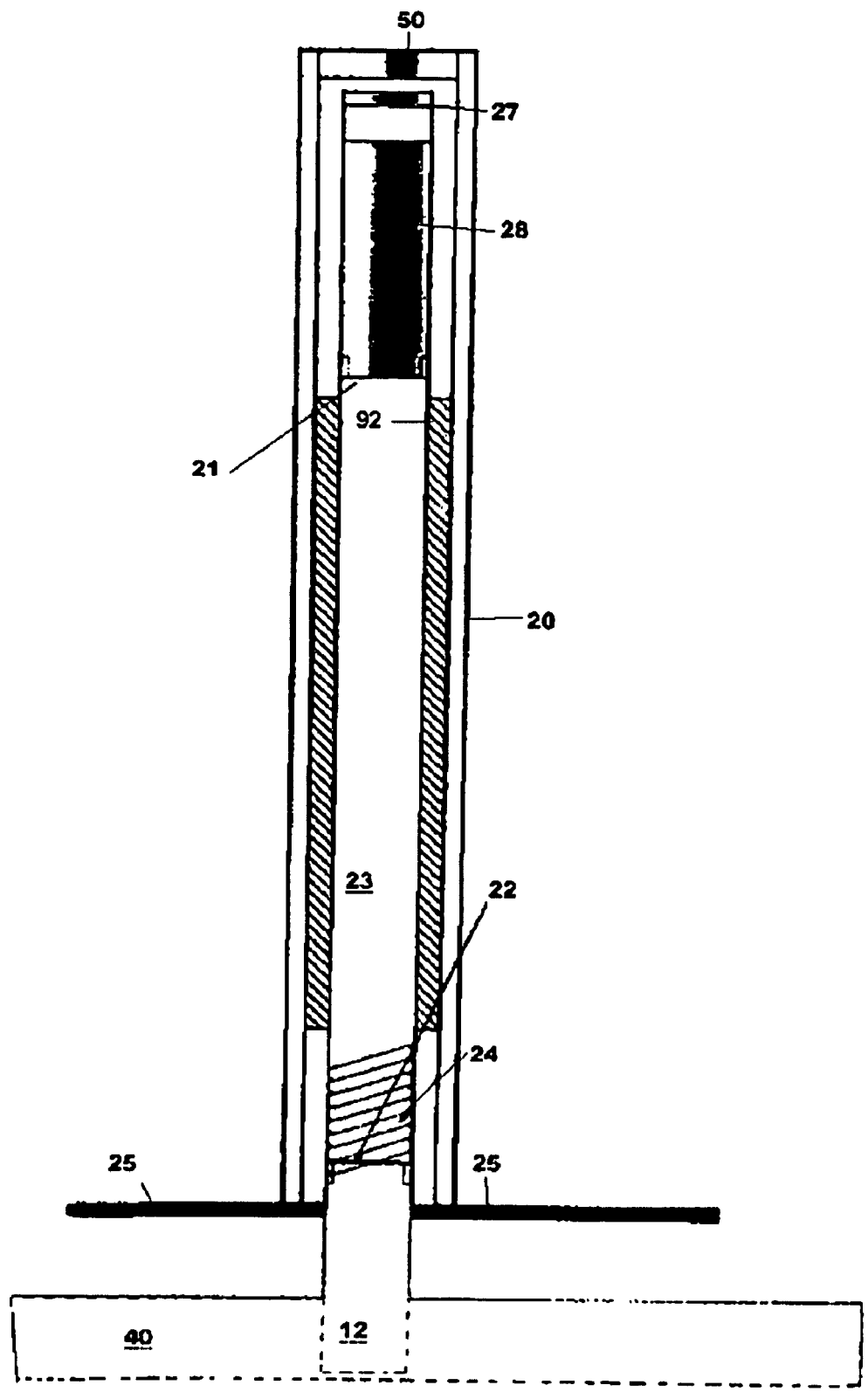
FIG. 2 is a sectional view of the impact generator portion of the impact handle.

The impact generator 20 is located between the tool end 12 and free end 11. The impact generator 20 is powered by a power supply 29 which may be either a 110 V A/C cord or a battery supply. The impact generator 20 is activated through an actuation means which can be either a foot actuator 25 or impulse switch 26. As shown in FIG. 2, the foot actuator 25 would be located at the tool end 12 of the impact handle 10. Depressing the foot actuator 25, would close the circuit to generate impacts as well as to provide downward pressure on the shovel blade 41 as conventionally operated. A hand operated on/off actuator or impulse switch 26 would be used to generate impulse impacts without the use of the foot actuator 25, for example to assist dislodging of sticky material. The impulse switch 26 would be placed on the surface of the impact handle 10 at a location for convenient access by the operator.

As also shown in FIG. 2, the impact generator 20 contains an impact slug 28, composed of a permanent magnet, preferably with a weight of 0.5 to 2 lbs. The impact slug 28 would reciprocate within a slide chamber 23. Reciprocation of the impact slug would be limited by a static impact surface 22 at the tool end, and a stopper 27 composed of rubber or other resilient material at the opposite end. The impact slug 28 would have an active impact surface 21 that would be stopped by the static impact surface 22, which would transmit the impact forces to the shovel blade 41 at the tool end 12 of the impact handle 10. The falling impact slug would also compress the return spring 24, which would assist the impact slug's return towards the tool handle's free end 11.

Although the impact slug generates an upward impact as well as the downward force used to dislodge the material, the upward force is mitigated by the force of gravity which assists downward forces and opposes the upward force, the physical downward foot-pressure of the operator and the energy dissipating properties of the stopper. Furthermore, this minimal upward moment of lift, provides an advantageous recoil to the impact it is about to deliver. When downward pressure is applied by the user's left or right foot on either side of the scoop/blade, unto the foot actuator 25, impacts of 1 to 10 impulses per second are imposed by the shovel blade or tool 'unto and into' the material being excavated.

Figure 3:
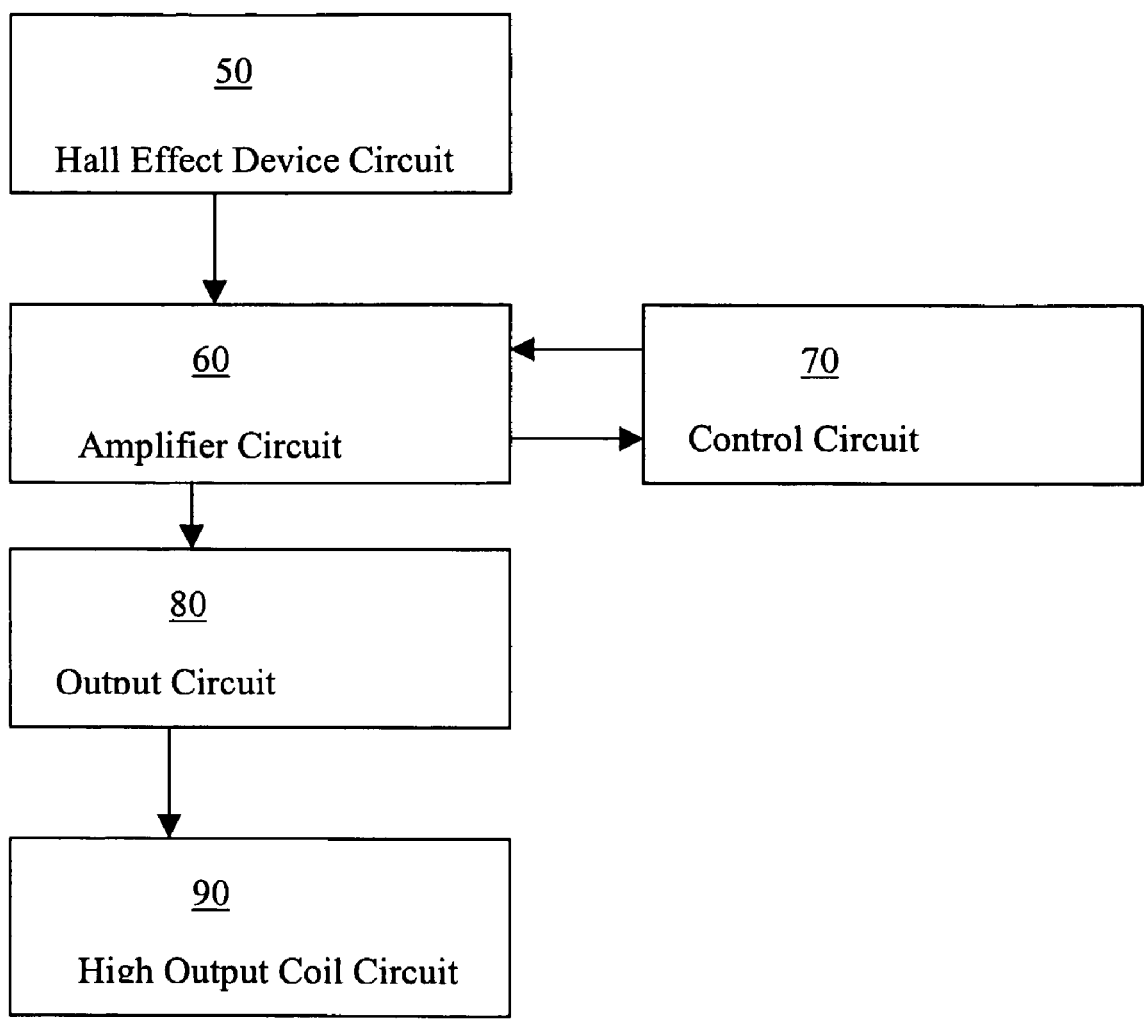
FIG. 3 is a block diagram of the impact generator electrical system.
Figure 4:
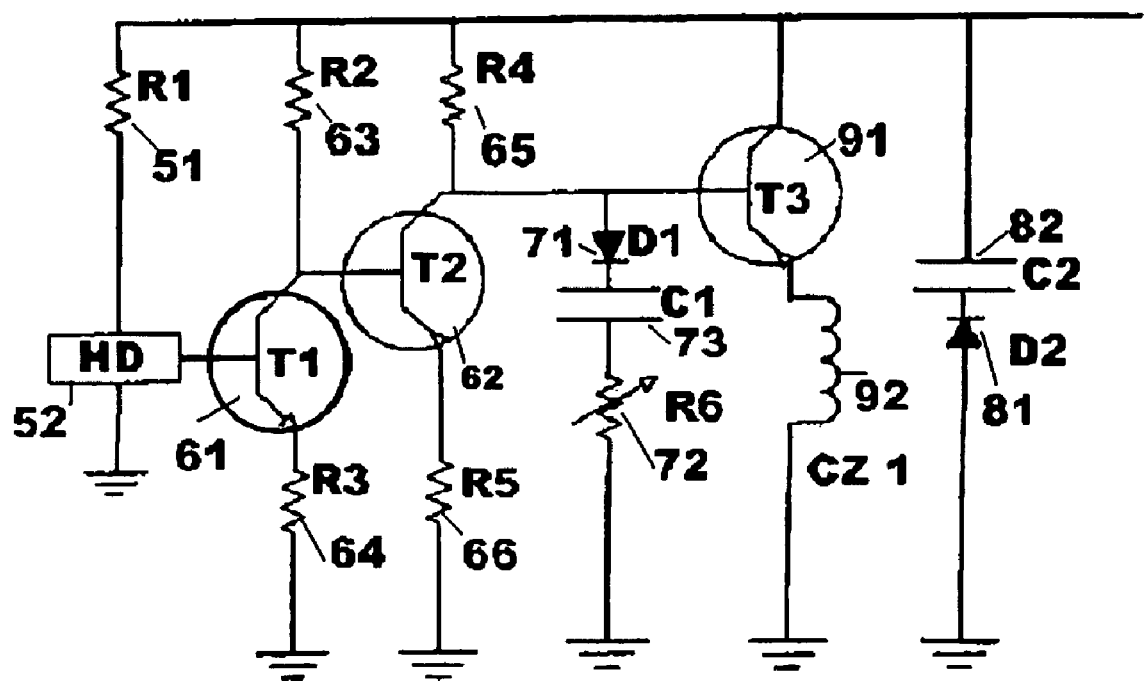
FIG. 4 is a schematic diagram of the impact generator electrical components.

FIG. 3 shows a block diagram of the electrical circuitry of the impulse generator. The electro-magnetic circuitry components of the invention consist of a Hall effect device circuit 50, an amplifier circuit 60, control circuit 70, an output or bleed-off circuit 80, and a high output coil circuit 90. As shown in FIG. 4, the Hall effect device circuit 50 consists of a carbon resistor R1 51 and the Hall Device magnetic switch 52. The amplifier circuit 60 contains; switching transistor T1 61, switching transistor T2 62, carbon resistor R2 63, carbon resistor R3 64, carbon resistor R4 65, and carbon resistor R5 66. The control circuit 70, has diode D1 71, linear taper potentiometer R6 72 and electrolytic capacitor C1 73. The bleed-off circuit 80 contains, diode D2 81, and electrolytic capacitor C2 82. In addition the resistor R5 66 is also used to bleed-off the current created when the impact slug 28 passes the magnetic flux coil on its return trip towards the free end of the impact generator.

The high output coil circuit 90 contains the power transistor T3 91 and the magnetic flux coil CZ 1 92. The impact slug 28 interacts with the Hall Effect device circuit and the high output coil circuit as described below.

The actuation means energizes the impact generator circuitry with the power supply 29, allowing the impact slug consisting of a permanent magnet in the presence of the Hall Effect device circuit 50 to bias the switching transistor T1 61 to on. Transistor T1 61 in turn activates transistor T2 62. Transistor T2 62 then activates T3 91. When T3 91 is activated it draws current through the magnetic flux coil CZ 1 92. The magnet flux coil draws the impact slug 28 rapidly down the slide chamber through the coil. As the impact slug 28 moves away from the Hall device magnetic switch 52, the transistors T1 61, T2 62 and T3 91 are opened causing the magnetic field to collapse which stops the magnetic flux coil from holding the impact slug in mid path. The impact slug travels down the slide chamber 23 and strikes the static impact surface 22 which delivers energy to the working edge of the shovel. The deenergized impact coil allows the spring 24 to return the slug to its starting position which closes the Hall Effect device circuit and starts the cycle again. The linear taper potentiometer R6 72 is variable and is used to control the amount of current passing through the coil and therefore the speed of the magnetic slug, preferably at a rate of 1 to 10 hertz Diode D2 81 bleeds the reverse Electro Magnetic Force (EMF) generated when the impact slug passes back through the coil to ground. The same is true of the EMF generated with the collapse of the magnetic field when the Hall Effect device circuit opens and continuity is broken.

Operation of the impact handle shovel involves plugging into a regular 110-volt household receptacle. A ground fault interceptor is generally provided on the cord for protection against electrical shock hazard. The linear taper potentiometer 72 is a round switch located on the handle and must be turned clockwise to the "ON' position. The more the switch is turned in the clockwise direction, the faster the impulses will be delivered. It will typically include an open circuit or "Off" position as well.

The blade or broad scoop of the impact handle shovel is then placed on the dirt or material being excavated. Next, the operators left or right foot is placed on top of the blade or broad scoop. The operator applies downward pressure on the foot actuator located at the top of the blade or broad scoop. The impact handle shovel will immediately begin to operate. The operator will feel an impact vibration that will cause the blade or broad scoop to penetrate into the material being excavated. Different materials of various densities may require faster or slower impacts. The "On-Off-Control" potentiometer on the handle may be adjusted as required. There is a small compressible rubber button or impulse switch on the handle below the "On-Off-Control" potentiometer. When this button is depressed, it will also cause the impact handle to send impacts or pulses to the blade or broad scoop. This feature is extremely useful in vibrating off material that has stuck to the blade. Release pressure off the impulse button to stop the impact vibration. The "On-Off-Control" button is turned to "Off" when the excavation project is completed. The power cord is unplugged from the receptacle. The tool is cleaned after each use so that it is ready to go for the next project.

ELECTRICAL COMPONENT LIST

| Reference Number | Abbreviation | Description |
| --- | --- | --- |
| 51 | R1 | Carbon resistor |
| 63 | R2 | Carbon resistor |
| 64 | R3 | Carbon resistor |
| 65 | R4 | Carbon resistor |
| 66 | R5 | Carbon resistor |
| 72 | R6 | Linear taper potentiometer |
| 61 | T1 | Switching transistor |
| 62 | T2 | Switching transistor |
| 91 | T3 | Power transistor |
| 71 | D1 | Diode |
| 81 | D2 | Diode |
| 73 | C1 | Electrolytic capacitor |
| 82 | C2 | Electrolytic capacitor |
| 92 | CZ 1 | Magnetic flux coil |
| 52 | HD | Hall Device magnetic switch |

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An impact handle for use with a tool head comprising:
   a tool end adapted to receive the tool head, a free end, and an impact generator, the impact generator located between the tool end and the free end;
   the impact generator generally having a cylindrical shape forming a cavity, the cavity containing a static impact surface near the tool end, a stopper near the free end of the cavity, a slide chamber between the stopper and the static impact surface an impact slug and an active impact surface;
   a reciprocation means moving the impact slug within the slide chamber forcing the active impact surface of the impact slug to strike the static impact surface at a frequency of 1 to 10 hertz, the static impact surface being in rigid connection with the tool head;
   the reciprocation means also having a power supply, an actuation means, a hall effect device circuit, an amplifier circuit, an output circuit, a control circuit, a bleed-off circuit and a high output coil circuit.

2. The impact handle of claim 1 wherein; the actuation means is a foot actuator.

3. The impact handle of claim 2 wherein; the power supply is 110 volt AC current.

4. The impact handle of claim 3 wherein; the tool head is a shovel blade.

5. The impact handle of claim 3 wherein; the tool head is a floor scraper.

6. The impact handle of claim 3 wherein; the tool head is a chisel.

7. The impact handle of claim 3 wherein; the tool head is a crow bar.

8. The impact handle of claim 3 wherein; the tool head is a carpet stretcher.

9. The impact handle of claim 1 wherein; the actuation means is an impulse switch.

* * * * *